(12) United States Patent
Zajec

(10) Patent No.: US 11,867,110 B2
(45) Date of Patent: Jan. 9, 2024

(54) ELEMENT FRAME ASSEMBLIES CONTAINING MONOLITHS

(71) Applicant: Johnson Matthey Catalysts (Germany) GmbH, Redwitz an der Rodach (DE)

(72) Inventor: Nikola Zajec, Redwitz an der Rodach (DE)

( * ) Notice: Subject to any disclaimer, the term of this patent is extended or adjusted under 35 U.S.C. 154(b) by 0 days.

(21) Appl. No.: 16/949,967

(22) Filed: Nov. 23, 2020

(65) Prior Publication Data

US 2021/0164379 A1 Jun. 3, 2021

(30) Foreign Application Priority Data

Dec. 3, 2019 (GB) ..................... 1917634

(51) Int. Cl.
*F01N 3/28* (2006.01)
*B01J 35/04* (2006.01)

(52) U.S. Cl.
CPC ............ *F01N 3/2853* (2013.01); *B01J 35/04* (2013.01); *F01N 3/2842* (2013.01)

(58) Field of Classification Search
None
See application file for complete search history.

(56) References Cited

U.S. PATENT DOCUMENTS

| 4,814,146 A | 3/1989 | Brand |
| 5,656,245 A | 8/1997 | Fujisawa et al. |
| 10,077,701 B2 | 9/2018 | Döring et al. |
| 10,533,475 B2 | 1/2020 | Kleuderlein et al. |
| 2005/0183408 A1 | 8/2005 | Noller |
| 2006/0177359 A1 | 8/2006 | Sinha et al. |
| 2017/0159529 A1* | 6/2017 | Kleuderlein ............. B01J 35/04 |
| 2017/0204768 A1 | 7/2017 | Döring |
| 2018/0305210 A1* | 10/2018 | Olbert ..................... C01B 21/28 |
| 2019/0178139 A1 | 6/2019 | Chenoweth |
| 2019/0275699 A1* | 9/2019 | Okumura .............. B28B 11/248 |

FOREIGN PATENT DOCUMENTS

| JP | 07213865 | 8/1991 |
| JP | 2017-521596 A | 8/2017 |
| JP | 2019-504236 A | 2/2019 |
| WO | 2011092521 A1 | 8/2011 |
| WO | 2014027207 A1 | 2/2014 |
| WO | 2017098224 A1 | 6/2017 |

\* cited by examiner

*Primary Examiner* — Sheng H Davis

(57) ABSTRACT

An element frame assembly (1) comprising an element frame (2) for holding at least one monolith (3) containing catalysts in the flow of exhaust gases from a combustion source. The element frame (2) comprising two pairs of opposing walls (10), an interior (11) formed by the walls (10), an inlet end (12) and an outlet end (13). The least one monolith (3) comprising an inlet (20), an outlet (20), four sides (22) and at least one catalyst. At least one knit wire mesh bearing element (4) is provided such that there is at least a portion of the at least one knit wire mesh bearing element (4) between the at least one monolith (3) and each adjacent wall (10) of the element frame (2).

15 Claims, 12 Drawing Sheets

ELEMENT FRAME ASSEMBLIES CONTAINING MONOLITHS

The present disclosure relates to element frame assemblies that holds one or more monoliths containing catalysts within an element frame, wherein the element frame assemblies are configured to be placed in the flow of an exhaust gas from an engine, an exhaust gas from an industrial process or similar.

BACKGROUND OF THE DISCLOSURE

The present disclosure relates to element frame assemblies that may be used individually or in groups for treating exhaust gases. The element frame assemblies may be contained in a catalyst module. The element frame assemblies contain one or more monoliths, each containing one or more catalysts for treating exhaust gases from a combustion source. The combustion source is typically a stationary combustion source. A stationary combustion system can be any system that combusts a hydrocarbon-based fuel that is not used in an on-road operated car, truck or aircraft. They can be, for example, coal-fired systems, oil-fired (petroleum) systems, gas turbines or other industrial processes. Stationary combustion systems can also be used in marine applications, where combustion systems such as diesel engines, are used in large container or cruise ships.

Hydrocarbon combustion in stationary combustion systems, and in engines used in mobile applications, generates exhaust gas that must be treated to remove pollutants like nitrogen oxides (NOx), carbon monoxide (CO) or hydrocarbons (HC) that are formed. NOx is known to cause a number of health issues for humans and animals as well as causing a number of detrimental environmental effects including the formation of smog and acid rain. CO is toxic to humans and animals and HC can cause adverse health effects. To mitigate both the human and environmental impact from these pollutants, especially NOx, in exhaust gas, it is desirable to eliminate these undesirable components, preferably by a process that does not generate other noxious or toxic substances.

In stationary combustion sources it is known to provide one or more catalyst modules each comprising a plurality of element frame assemblies. WO2017/098224 describes one such example. Each catalyst module may be formed by coupling together a plurality of element frame assemblies. Each element frame assembly comprises an element frame which holds at least one monolith in an interior of the element frame.

One or more catalyst modules may be installed in an exhaust gas duct to form at least a part of an emission control system for purifying an exhaust gas which flows during operation through the monoliths.

In stationary combustion sources the exhaust gas duct can typically have a cross-sectional area of a few square meters but can be in the tens to hundreds of square meters in size. The dimensions of the exhaust duct can vary widely depending upon many factors, including the size of the engine (or other source of exhaust), the conditions under which the engine is operated, permissible back pressure, etc. In some cases, the exhaust gas duct can have a rectangular cross-section with the width and the height of the duct each being several meters, for example, of 10 m×10 m. The entire cross-sectional area of the exhaust gas duct may be covered by one or more catalyst modules, each catalyst module containing one or more element frame assemblies, each element assembly containing one or more monoliths.

The catalyst modules may be arranged next to one another so that all the exhaust gas passes through the monoliths. Several catalyst modules, for example, two to five, can be placed next to one another in rows and columns, for example connected in a supporting framework, within the exhaust gas duct. The catalyst modules themselves typically have a rectangular cross-section with an edge length of several meters.

In the direction of flow of the exhaust gas, the catalyst modules may be located in several planes positioned one behind the other. In some applications, the catalyst modules can extend for several meters, and even as much as 10-15 meters in the direction of flow.

A problem with such element frame assemblies is ensuring that monoliths within each element frame assembly are held with sufficient force to retain the monoliths in position to prevent mechanical damage to the monoliths during operation. For some applications, such as marine or gas turbines, relatively harsh ambient conditions in terms of mechanical stress can be present for the catalyst modules. For example, on marine vessels, high levels of vibration may occur and forces several times gravity can be experienced. In addition, especially for large cross-sections of catalyst modules used with gas turbines, mechanical stresses due to earthquakes have to be considered.

To try and address this problem, it is known to provide a mat, for example of fibre, placed between the side walls of the monolith and the element frame element to provide a cushion against vibration. However, a typical problem encountered in the use of such mats is that it may be difficult to ensure that the mats are able to stay in place during normal use, in particular in situations where there is periodical mechanical stress, which is typical in exhaust system conditions where engine pulsation leads to shock and vibrations.

In an attempt to mitigate this problem, WO2017/098224 describes an arrangement where at least one monolith is positioned in an interior of an element frame so that there is at least one mat between the monolith and each adjacent wall of the element frame and a locking element is provided which extends across an inlet end and or an outlet end of the element frame so as to be connected to two opposite sides of the element frame. It is also described that at least one wall, preferably each wall, of the element frame can comprise a plurality of protrusions extending into the interior of the element frame. The plurality of protrusions can be configured to contact the mat and hold the mat against the monolith.

While the arrangement of WO2017/098224 is useful in mitigating the problems described above, there remains a need for alternative and improved solutions for preventing or mitigating mechanical damage to monoliths held within element frames. In particular, it would be desirable to provide an improved arrangement that does not necessitate the provision of protrusions in the walls of the element frame since providing these increases the manufacturing cost and complexity of the element frame assemblies.

SUMMARY OF THE DISCLOSURE

In a first aspect, the present disclosure provides an element frame assembly for holding at least one monolith containing catalysts in the flow of exhaust gases from a combustion source, the element frame assembly comprising an element frame and at least one monolith;
 the element frame comprising:
  two pairs of opposing walls, wherein the walls form a rectangular or square shape;

an interior formed by the walls;
an inlet end; and
an outlet end;
the least one monolith comprising:
an inlet;
an outlet;
four sides; and
at least one catalyst effective in reducing the concentration of one or more gases in the exhaust gas;
the element frame assembly further comprising at least one knit wire mesh bearing element;
wherein the at least one monolith is positioned in the interior of the element frame so that there is at least a portion of the at least one knit wire mesh bearing element between the at least one monolith and each adjacent wall of the element frame.

Advantageously, the use of the knit wire mesh bearing elements has been found to improve bearing and damping properties of the element frame assembly. They may, in particular, mitigate or prevent substantial damage to the monolith caused by externally-induced vibrations and shocks. The knit wire mesh bearing elements have been found to be particularly advantageous for mounting square or rectangular shaped monoliths in an element frame.

Preferably at least one knit wire mesh bearing element may be located at the inlet end and or the outlet end of the element frame.

Preferably the at least one knit wire mesh bearing element may extend over at least one edge of the at least one monolith at the inlet and or the outlet of the at least one monolith. The inlet of the at least one monolith may comprise two pairs of opposing inlet edges, wherein the inlet edges form a rectangular or square shape; and the at least one knit wire mesh bearing element may extend over the two pairs of opposing inlet edges. The outlet of the at least one monolith may comprise two pairs of opposing outlet edges, wherein the outlet edges form a rectangular or square shape; and the at least one knit wire mesh bearing element may extend over the two pairs of opposing outlet edges.

Advantageously, extending the knit wire mesh bearing elements over the inlet and or outlet edges of the monoliths has been found to mitigate damage to the monolith in use. It is believed that the knit wire mesh bearing elements are enabled to provide both radial and longitudinal support and damping to the monoliths within the element frame. Thus, in particular, the knit wire mesh bearing elements may provide improved longitudinal support of the monoliths within the element frame helping to prevent shifting of the monoliths within the interior of the element frame.

Preferably the at least one knit wire mesh bearing element has an annular shape. The at least one knit wire mesh bearing element may have a rectangular or square shape. Optionally, the at least one knit wire mesh bearing element may have a rectangular ring shape or a square ring shape.

The at least one knit wire mesh bearing element may comprise a first portion that extends over a part of the inlet or outlet of the at least one monolith and a second portion that extends along a part of the four sides of the at least one monolith. The first portion and the second portion of the at least one knit wire mesh bearing element may extend perpendicularly to each other, preferably forming an L-shape in cross-section. The first portion may extend 2 to 10 mm, optionally 3 to 8 mm, optionally 5 mm over an inlet face of the inlet or the outlet face of the outlet of the at least one monolith. The second portion may extend 5 to 25 mm, optionally 8 to 15 mm, optionally 12 mm along the four sides of the at least one monolith.

Preferably the at least one knit wire mesh bearing element comprises a first knit wire mesh bearing element located at the inlet end of the element frame and a second knit wire mesh bearing element located at the outlet end of the element frame.

Advantageously, providing a knit wire mesh bearing element at both the inlet end and the outlet end of the element frame has been found to further improve the longitudinal support of the monoliths within the interior of the element frame.

The element frame assembly may further comprise at least one seal located between the at least one monolith and each adjacent wall of the element frame, the at least one seal being located longitudinally between the first knit wire mesh bearing element and the second knit wire mesh bearing element. The seal may be a mat, optionally a fibre mat, optionally an intumescent fibre mat.

Advantageously, using knit wire mesh bearing elements and seals, such as fibre mats, in combination may produce particular advantages. The seal may be used primarily to prevent or reduce gas bypass and therefore may be reduced in size compared to seals that have been used in prior art arrangements primarily for their damping and support properties. In addition, the material and composition of the seal may be chosen to enhance its sealing properties rather than its bearing capacity since the primary support and damping of the monoliths is provided by the knit wire mesh bearing elements.

Two or more monoliths may be present in the interior of the element frame, the at least two monoliths may be located adjacent to each other, and the at least one knit wire bearing element may be located between monoliths that are adjacent to each other.

Four or more monoliths may be present in the interior of the element frame, the at least four monoliths may be located in a two-by-two matrix arrangement with each monolith being adjacent to two others, and the at least one knit wire bearing element may be located between monoliths that are adjacent to each other.

Preferably a separate knit wire mesh bearing element may be located at each of the inlet and the outlet of each of the at least one monoliths.

The at least one knit wire mesh bearing element may comprise knit wire mesh. The knit wire mesh may be formed from any suitable steel, for example a carbon steel, a stainless steel, for example type 1.4301 or type 1.4307 stainless steel. The at least one knit wire mesh bearing element may have a density of 0.8 to 1.5 $g/cm^3$, optionally 1.1 to 1.3 $g/cm^3$, optionally 1.2 $g/cm^3$. The at least one knit wire mesh bearing element may have a spring deflection of 0.9 to 1.5 mm.

The element frame assembly may further comprise at least one locking element; each locking element extending across the inlet end or outlet end of the element frame and being connected to two opposite sides of the element frame. At least two locking elements may be located on the inlet end of the element frame and at least two locking elements may be located on the outlet end of the element frame.

Advantageously, the use of at least one locking element may provide additional longitudinal support of the monolith within the element frame.

The at least two locking elements may be arranged as a cross and a locking plate may be provided at a junction between the at least two locking elements, wherein the locking plate engages the at least one knit wire mesh bearing element. When the element frame comprises at least two monoliths, a space may be located between adjacent monoliths and at least one of the locking elements may be centred on, and optionally located in, the space between the at least two monoliths. The at least one knit wire mesh bearing element may comprise a first portion that extends over a part of the inlet or outlet of the at least one monolith and a second portion that extends along a part of the four sides of the at least one monolith, and the locking plate may engage the first portion of the at least one knit wire mesh bearing element. Each locking element may be located in a space between two monoliths with the locking element sandwiched between the second portions of two adjacent knit wire mesh bearing elements.

Such an arrangement has been found to be particularly advantageous in preventing damage to the monoliths within the element frame. In particular, the engagement of the locking plate directly against the knit wire mesh bearing elements has been found to improve damping and bearing capacity. Further, the sandwiching of the locking elements between adjacent knit wire mesh bearing elements has been found to provide mutual support to both the knit wire mesh bearing elements and the locking elements themselves. Thus, compared to locking elements that extend across the inlet and outlet faces of the monoliths, the locking elements of the present disclosure have been found to be more durable and less liable to failure during externally-induced vibrations and shocks.

Further, such an arrangement may allow the planar bodies of the locking elements to be orientated parallel to the longitudinal axis of the monoliths such that the locking elements present an edge towards the respective inlet end and outlet end. This has an advantage in preventing the locking elements inhibit gas flow into or out of the monoliths.

The element frame may further comprise one or more flanges that extend inwardly from the inlet end and or the outlet end perpendicular to the walls; wherein the one or more flanges may engage the at least one knit wire mesh bearing element.

Advantageously, providing flanges that engage the knit wire mesh bearing elements has been found to further improve the longitudinal support of the monoliths within the interior of the element frame.

The element frame may comprise two L-shaped assemblies, each L-shaped assembly comprising one wall of each of the two pairs of opposing walls. The two L-shaped assemblies may be connectable together, optionally by welding, to form the element frame.

The at least one monolith may each have a rectangular or square shape. The monolith may comprise an SCR catalyst or an oxidation catalyst. The at least one monolith may be a filter, e.g. a wall-flow filter In a second aspect, the present disclosure provides an element frame assembly for holding at least one monolith containing catalysts in the flow of exhaust gases from a combustion source, the element frame assembly comprising an element frame and four or more monoliths;
 the element frame comprising:
  two pairs of opposing walls, wherein the walls form a rectangular or square shape;
  an interior formed by the walls;
  an inlet end;
  an outlet end; and
  one or more flanges that extend inwardly from the inlet end and or the outlet end perpendicular to the walls;
 the four or more monoliths each having a rectangular or square shape and comprising:
  an inlet;
  an outlet;
  four sides; and
  at least one catalyst effective in reducing the concentration of one or more gases in the exhaust gas;
 wherein the four or more monoliths are positioned in the interior of the element frame, at least four of the monoliths being located in a two-by-two matrix arrangement with each monolith being adjacent to two others;
 there being positioned on each of the at least four monoliths a first knit wire mesh bearing element that extends over edges of the monolith at its inlet and a second knit wire mesh bearing element that extends over edges of the monolith at its outlet;
 the first knit wire mesh bearing elements and the second knit wire mesh bearing elements being positioned between adjacent pairs of the at least four monoliths and between the at least four monoliths and adjacent walls of the element frame.

In a third aspect, the present disclosure provides a catalyst module comprising a plurality of element frame assemblies according to the first or second aspects.

In a fourth aspect, the present disclosure provides an exhaust system comprising an element frame assembly according to the first or second aspects or a catalyst module according to the third aspect. The exhaust system may be an exhaust system of a stationary combustion system, optionally a marine or naval stationary combustion system.

BRIEF DESCRIPTION OF THE DRAWINGS

Aspects and embodiments of the present disclosure will now be described, by way of example only, with reference to the accompanying drawings, in which.

DETAILED DESCRIPTION

As used in this specification and the appended claims, the singular forms "a", "an" and "the" include plural referents unless the context clearly indicates otherwise. Thus, for example, reference to a "catalyst" includes a mixture of two or more catalysts, and the like.

In this specification the parameter "spring deflection" is the difference in compression (measured in mm) of a knit wire mesh bearing element at 3 bar pressure and 30 bar pressure.

The skilled reader will recognise that one or more features of one aspect or embodiment of the present disclosure may be combined with one or more features of any other aspect or embodiment of the present disclosure unless the immediate context teaches otherwise.

An example of an apparatus in accordance with the present disclosure will now be described with reference to FIG. 1 which shows an element frame assembly 1 for holding at least one monolith 3 containing catalysts in the flow of exhaust gases from a combustion source. The element frame assembly 1 comprises an element frame 2 and at least one monolith 3.

Figure 2:
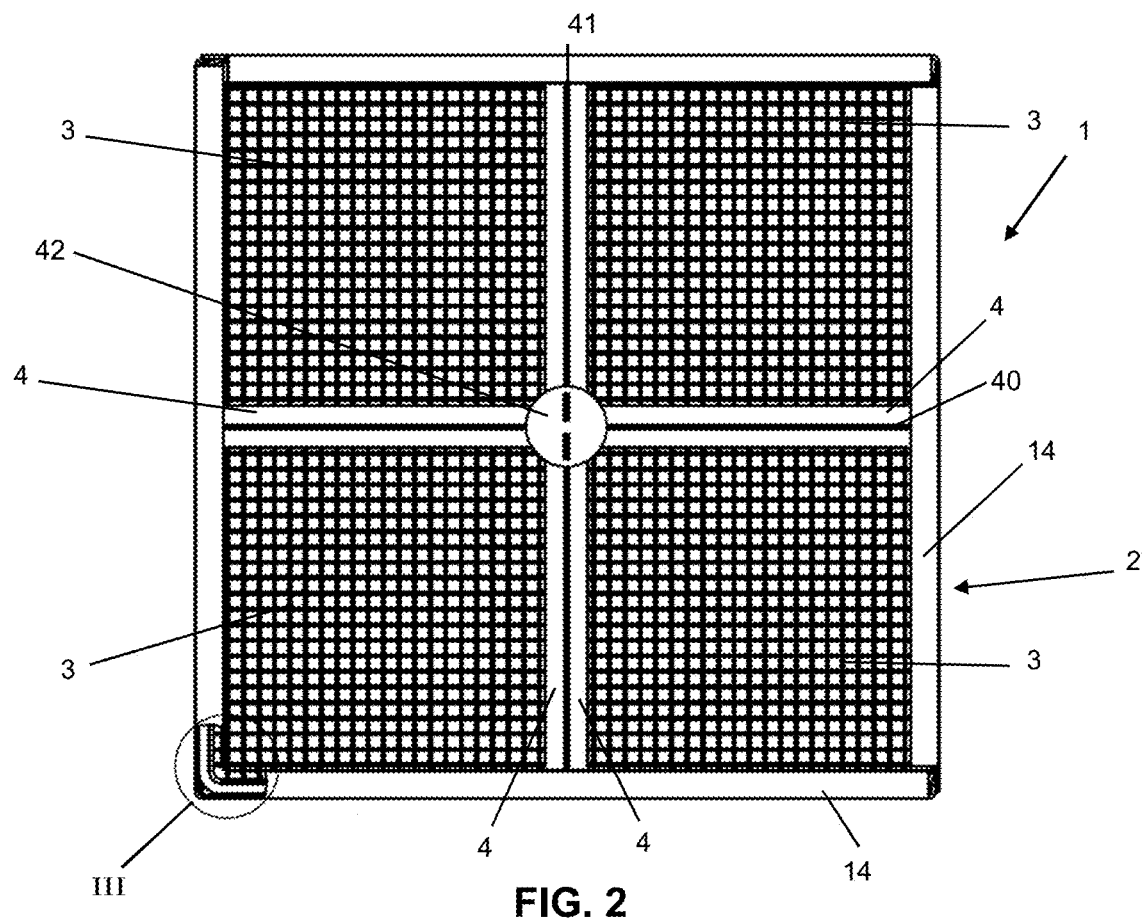
FIG. 2 is a part-sectioned end view of the element frame assembly of FIG. 1.

The element frame 2 comprises two pairs of opposing walls 10, wherein the walls 10 form a rectangular or, as shown in FIG. 2, a square shape. The walls 10 define an interior 11 formed by the walls 10. The element frame 2 has an inlet end 12 and an outlet end 13.

The walls 10 of the element frame 2 may be made of steel, of any suitable grade. The walls 10 may be of any suitable thickness, for example 1 to 3 mm, preferably 1.5 mm thick.

Figure 8:
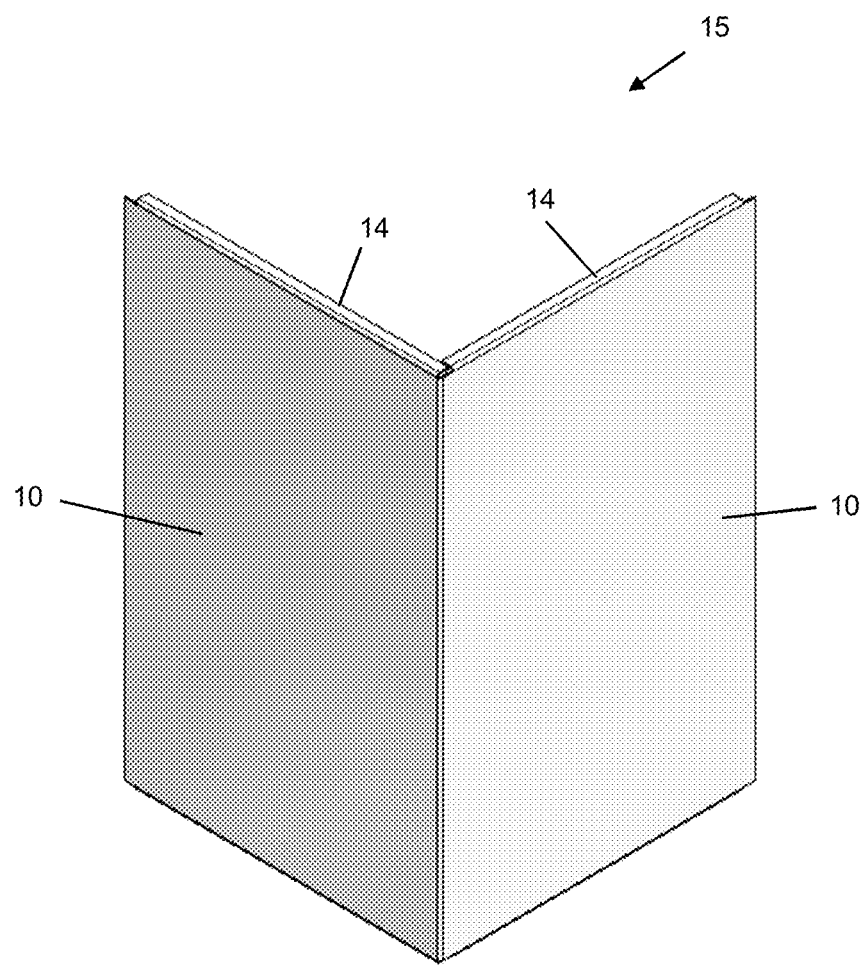
FIG. 8 is a perspective view of a first L-shaped assembly of the element frame assembly of FIG. 1.
Figure 9:
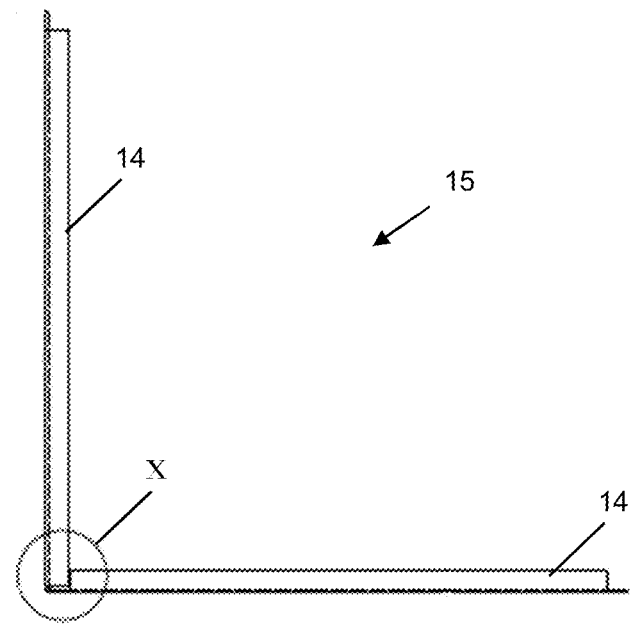
FIG. 9 is an end view of the first L-shaped assembly of FIG. 8.
Figure 10:
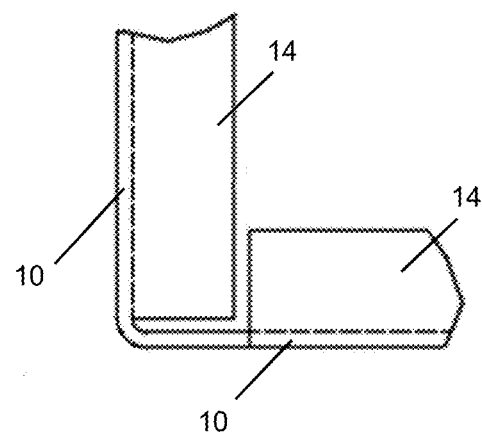
FIG. 10 is an enlarged view of a portion of FIG. 9.
Figure 11:
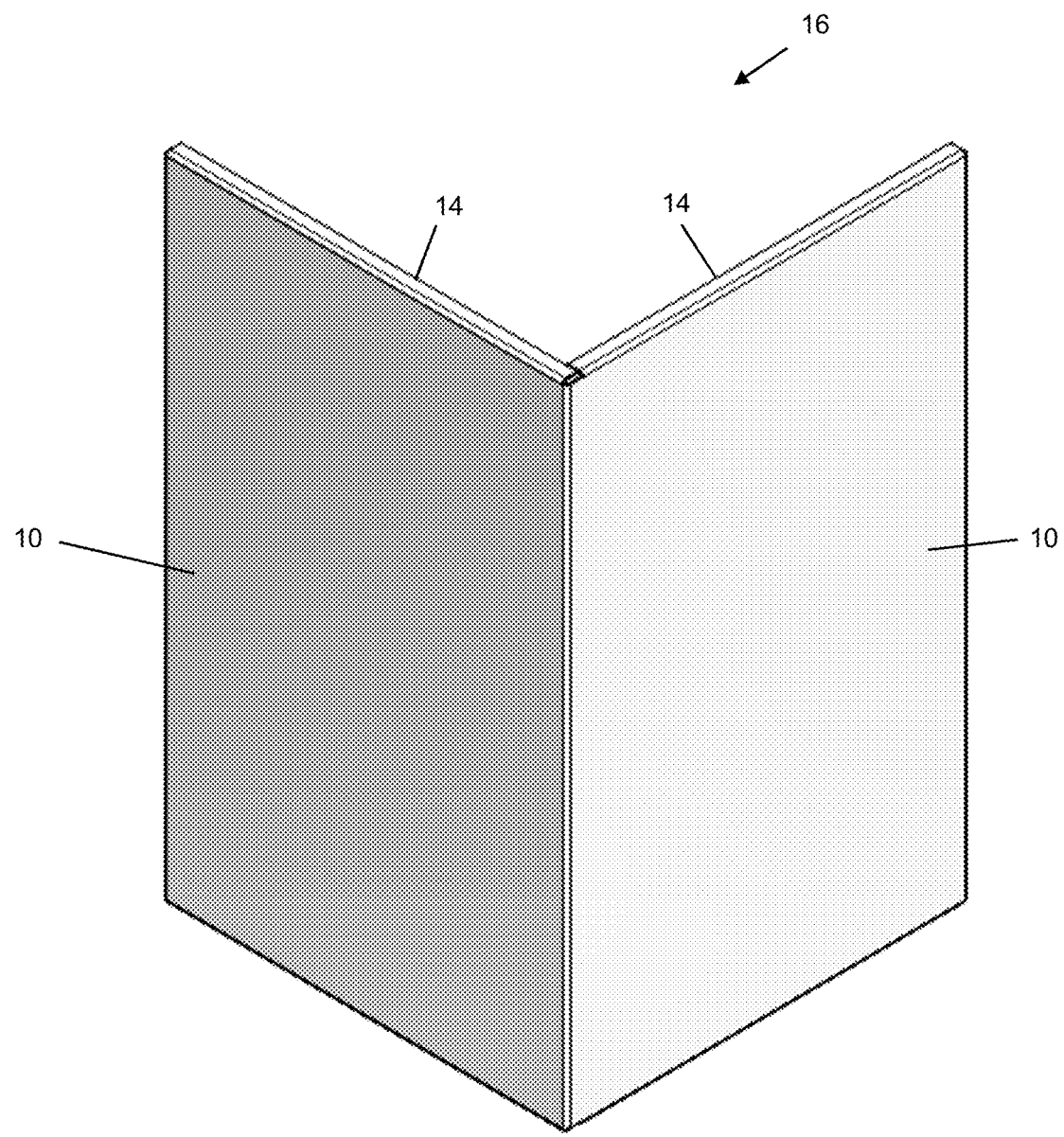
FIG. 11 is a perspective view of a second L-shaped assembly of the element frame assembly of FIG. 1.
Figure 12:
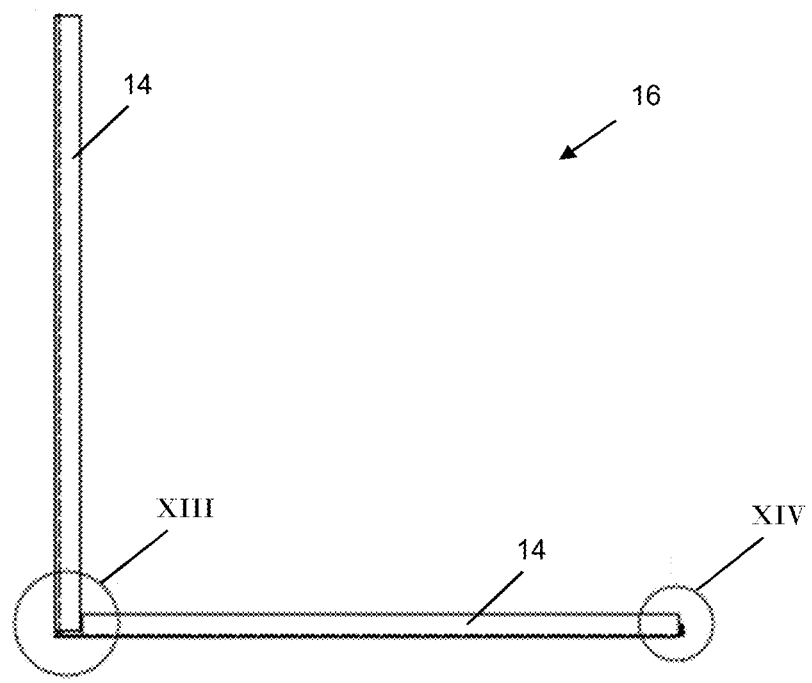
FIG. 12 is an end view of the second L-shaped assembly of FIG. 11.
Figure 13:
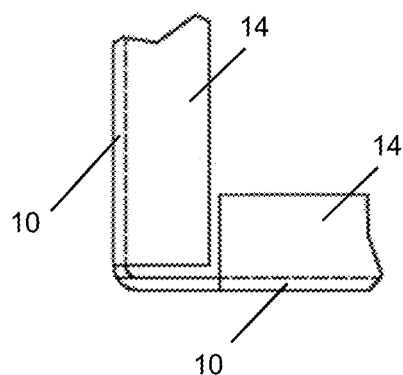
FIG. 13 is an enlarged view of a portion of FIG. 11.
Figure 14:
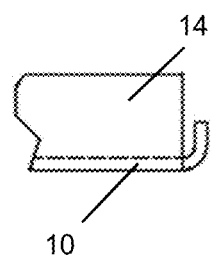
FIG. 14 is an enlarged view of another portion of FIG. 11.

The element frame 2 may be formed from a plurality of L-shaped assemblies 15, 16. A first L-shaped assembly 15, as shown in FIGS. 8 to 10, and a second L-shaped assembly 16, as shown in FIGS. 11 to 14, may be provided, each comprising one wall 10 of each of the two pairs of opposing walls 10. The first and second L-shaped assemblies 15, 16 may be connectable together, for example by welding, to form the element frame 2.

Figure 3:
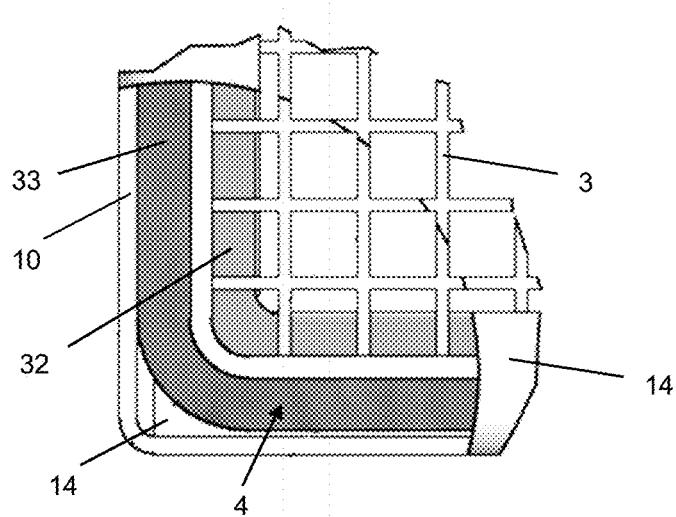
FIG. 3 is an enlarged view of a portion of FIG. 2.

As shown in FIGS. 2 and 3, each wall 10 may be provided with a flange 14 at its inlet and or outlet end 12, 13. Preferably each wall 10 comprises a flange 14 at both its inlet and outlet end 12, 13. Each flange 14 may be formed integrally with its respective wall 10 by a folding operation. Each flange 14 may extend perpendicularly to its respective wall 10. Each flange may extend by 7.5 mm to 15 mm.

The element frame 2 may contain a single monolith 3. However, preferably, the element frame 2 holds a plurality of monoliths 3 within the interior 11 formed by the four walls 10.

The element frame 2 may hold the monoliths 3 in different configurations, such as 1 by 2, 1 by 3, 3 by 3, etc. In the illustrated example, as shown in FIG. 2, the element frame 2 holds four monoliths 3 in a 2 by 2 configuration.

The length (depth) of the element frame 2 may be based on the length the monoliths 3 and the number of monoliths 3 that are desired to be placed serially within the element frame 2.

The or each monolith 3 comprises an inlet 20, an outlet 21 and four sides 22. The or each monolith 3 may have a rectangular or square shape. i.e. when viewed in the direction of the inlet 20, as shown in FIG. 2.

The or each monolith 3 (also known as a "honeycomb" type carrier) may have a plurality of fine, parallel gas flow passages extending from an inlet face at the inlet 20 to an outlet face at the outlet 21 of the monolith 3, such that passages are open to fluid flow. The or each monolith 3 may have a rectangular, preferably square, cross-sectional inflow surface. The faces of the monolith 3 can be of any dimensions, preferably between 100 mm to 1000 mm, inclusive, preferably 100 mm to 300 mm, inclusive. The length of the or each monolith in the direction of flow typically ranges from 150 mm to 1500 mm, although other lengths can be used. The dimension of the element frame assembly 1 in the direction of exhaust gas flow is approximately the length of the monolith 3 or combination of monoliths 3 where more than one monolith 3 are sequentially arranged in the direction of exhaust gas flow.

The or each monolith 3 may contain up to about 700 or more gas flow passages per square inch of cross-section, although far fewer may be used. For example, for stationary applications the or each monolith 3 typically may have from about 9 to 600, more usually from about 35 to 300, cells per square inch ("cpsi").

The or each monolith 3 is provided with at least one catalyst effective in reducing the concentration of one or more gases in the exhaust gas. The gas flow passages, which may be essentially straight paths from their fluid inlet to their fluid outlet, are defined by walls onto which one or more catalysts effective in treating exhaust gases may be coated as a "washcoat" so that the gases flowing through the gas flow passages contact the catalytic material.

One of ordinary skill in the art is familiar with the use and selection of one of more catalysts to store or reduce nitrogen oxides, oxidise carbon monoxides, store or oxidise hydrocarbons, oxidise ammonia (i.e. act as an ammonia slip catalyst) and oxidise or reduce other pollutants to form nitrogen, water and carbon dioxide, which are relatively harmless compounds. The or each monolith may comprise one or more of an SCR catalyst, an ammonia oxidation catalyst, a hydrocarbon oxidation catalyst, a NOx storage catalyst, an oxygen storage catalyst, etc. The or each monolith 3 may be a filter, such as a ceramic filter. Other types of catalyst can be present. The gas flow passages of the monolithic substrate may be thin-walled channels which can be of any suitable cross-sectional shape such as trapezoidal, rectangular, square, triangular, sinusoidal, hexagonal, oval, circular, etc.

The monolith 3 may comprise a ceramic substrate. Ceramic substrates may be made of any suitable refractory material, such as cordierite, cordierite-α alumina, α-alumina, silicon carbide, silicon nitride, zirconia, mullite, spodumene, alumina-silica magnesia, zirconium silicate, sillimanite, magnesium silicates, zircon, petalite, aluminosilicates and mixtures thereof.

The monolith 3 may be an extruded catalyst article. Methods of making an extruded catalyst article suitable for use in the present the invention are known e.g. from WO 2014/027207 A1 and WO 2011/092521 A1 or any of those acknowledged as background art herein. Suitable organic auxiliaries such as binders, fillers, pore modifiers, extrusion lubricants and plasticisers can be added to facilitate mixing to form an homogeneous extrudable mass. The organic auxiliaries may include cellulose, water soluble resins such as polyethylene oxide or polyethylene glycol and are burnt out from the final substrate during calcination.

As shown in FIGS. 1 to 4, the element frame assembly 1 further comprises at least one knit wire mesh bearing element 4. A knit wire mesh bearing element 4 may be located at the inlet end 12 or the outlet end 13 of the element frame 2. Preferably, a knit wire mesh bearing element 4 may be located at both the inlet end 12 and the outlet end 13 of the element frame 2. More preferably, each monolith 3 within the interior 11 is provided with a first knit wire mesh bearing element 30 located at the inlet 20 of the monolith 3 and separately a second knit wire mesh bearing element 31 located at the outlet 21 of the monolith 3.

The or each knit wire mesh bearing element 4 may be formed of knit wire mesh. The knit wire mesh may be formed from a metallic material, for example a carbon steel, a stainless steel, etc. In one preferred example, the knit wire mesh is type 1.4301 or type 1.4307 stainless steel.

The at least one knit wire mesh bearing element 4 may have a density of 0.8 to 1.5 $g/cm^3$, optionally 1.1 to 1.3 $g/cm^3$, optionally 1.2 $g/cm^3$.

Each knit wire mesh bearing element 4 may be subjected to compression when the walls of the element frame 2 are assembled.

The or each monolith 3 is positioned in the interior 11 of the element frame 2 so that there is at least a portion of the at least one knit wire mesh bearing element 4 between the at least one monolith 3 and each adjacent wall 10 of the element frame 2. In the case where two or more monoliths 3 are present in the interior 11 of the element frame 2 with the at least two monoliths 3 are located adjacent to each other, the preferably at least one knit wire mesh bearing element 4 is located between monoliths 3 that are adjacent to each other.

Each first knit wire mesh bearing element 30 may extend over at least one edge 23 of its respective monolith 3 at the inlet 20 of the monolith 3. Preferably each first knit wire mesh bearing element 30 may extend over all of the edges 23 at the inlet 20 of the monolith 3. The inlet 20 of the monolith 3 may comprise two pairs of opposing inlet edges 23, wherein the inlet edges 23 form a rectangular or square shape. In this case the first knit wire mesh bearing element 30 may extend over the two pairs of opposing inlet edges 23. The same applies to the second knit wire mesh bearing element 31 and the edges 24 of the outlet 21 of the monolith 3.

Figure 5:
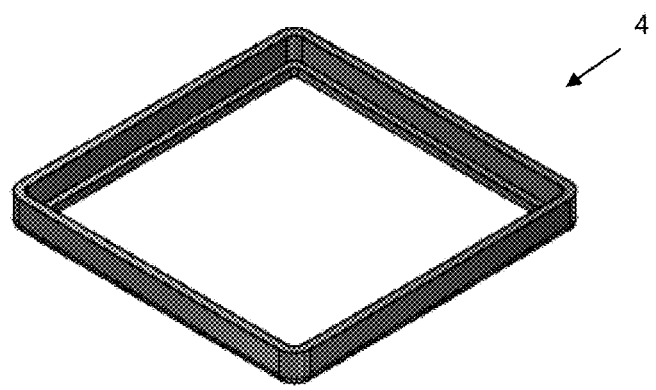
FIG. 5 is a perspective view of a knit wire mesh bearing element of the element frame assembly of FIG. 1.

As shown in FIG. 5, each knit wire mesh bearing element 4 may have an annular shape. The shape may be a rectangular or square shape. The shape may be a rectangular ring shape or a square ring shape.

Figure 6:
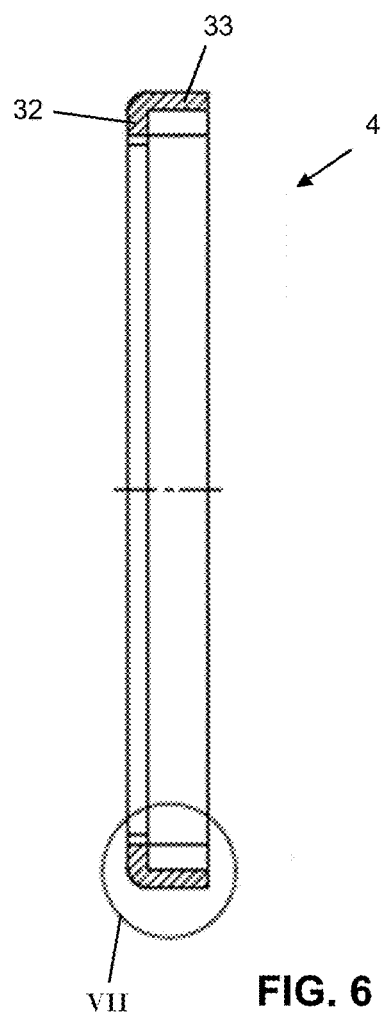
FIG. 6 is a cross-sectional side view of the knit wire mesh bearing element of FIG. 5.
Figure 7:
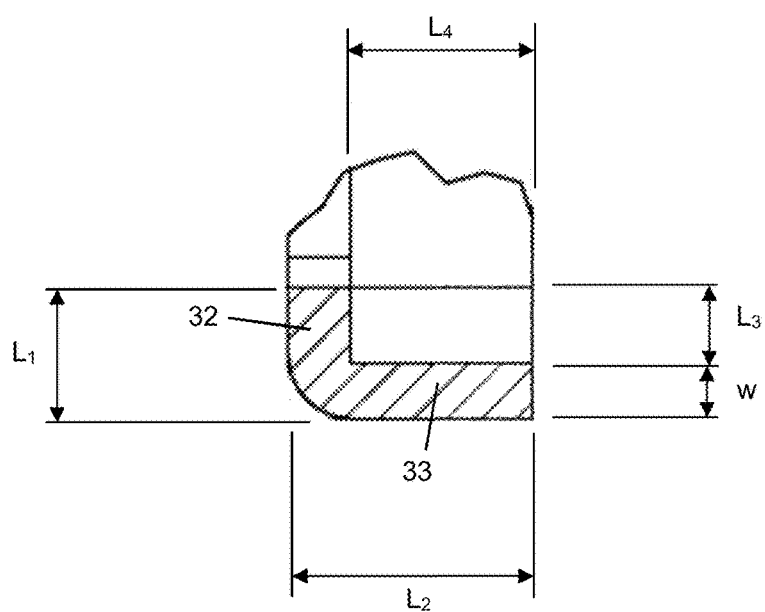
FIG. 7 is an enlarged view of a portion of FIG. 6.

As most clearly shown in FIGS. 6 and 7, the or each knit wire mesh bearing element 4 may comprise a first portion 32 that extends over a part of the inlet 20 or outlet 21 of the monolith 3 and a second portion 33 that extends along a part of the four sides 22 of the monolith 3. The first portion 32 and the second portion 33 of the at least one knit wire mesh bearing element 4 may extend perpendicularly to each other, preferably forming an L-shape in cross-section. The first portion 32 and the second portion 33 may have a thickness, w, of 3 to 5 mm, for example 3.5 mm or 4.5 mm.

The first portion 32 may have an exterior length $L_1$ which may be 5 to 15 mm. The first portion 32 may have an interior length $L_3$ which may extend 2 to 10 mm, optionally 3 to 8 mm, optionally 5 mm over an inlet face of the inlet 20 or the outlet face of the outlet 21 of the monolith 3.

The second portion 33 may have an exterior length $L_2$ which may be 8 to 20 mm. The second portion 33 may have an interior length $L_4$ which may extend 5 to 25 mm, optionally to 15 mm, optionally 12 mm along the four sides 22 of the monolith 3.

The at least one knit wire mesh bearing element 4 may have a spring deflection of 0.9 to 1.5 mm where the spring deflection is the difference in compression (measured in mm) of the knit wire mesh bearing element at 3 bar pressure and 30 bar pressure. Example spring deflections are set out in the following table, for a knit wire mesh bearing element formed of type 1.4301 stainless steel:

| | First portion exterior length, $L_1$ (mm) | Thickness, w (mm) | Spring deflection (mm) |
|---|---|---|---|
| Example 1 | 12 | 4.5 | 0.97 |
| Example 2 | 12 | 3.5 | 1.16 |
| Example 3 | 8.5 | 4.5 | 1.34 |
| Example 4 | 8.5 | 3.5 | 1.41 |

Figure 4:
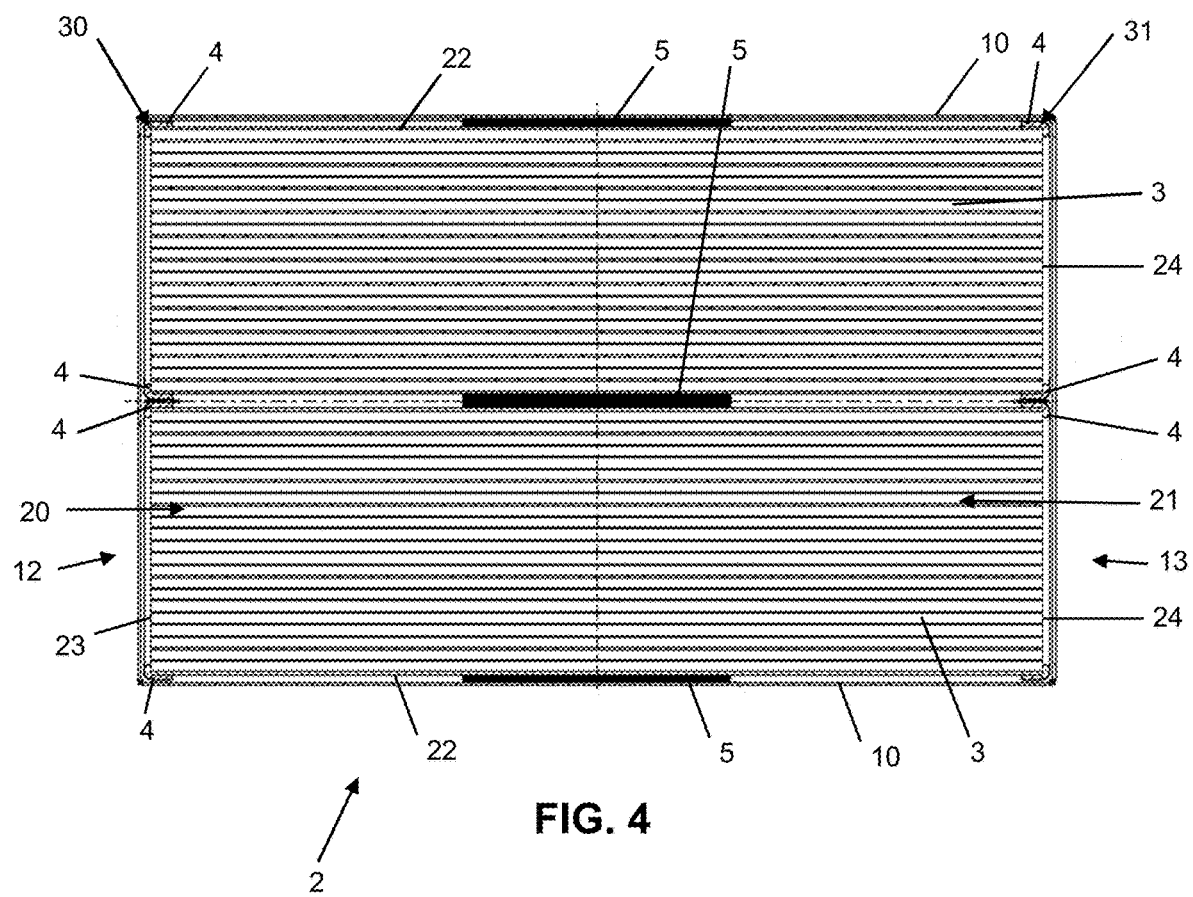
FIG. 4 is a cross-sectional side view of the element frame assembly of FIG. 1.

As shown in FIG. 4, the element frame assembly 1 may further comprise at least one seal 5 located between the or each monolith 3 and each adjacent wall 10 of the element frame 2 and or each adjacent monolith 3. The or each seal 5 may be located longitudinally between the first knit wire mesh bearing element 30 and the second knit wire mesh bearing element 31.

The or each seal 5 may have a longitudinal length that is from 20% to 40%, preferably 30% of the longitudinal length of the monoliths 3. For example, the or each seal 5 may have a longitudinal length of 150 mm in the case where the monoliths 3 have a longitudinal length of 500 mm.

In the case of monoliths 3 having a greater length it may be desirable to provide two or more seals 5. For example, for a monolith 3 of length 600 to 1000 mm length, two seals 5, each of length 140 to 160 mm may be provided spaced apart along the length of the monolith 3.

The or each seal 5 may be located at or near a mid-point of the length of the element frame assembly 1 as shown in FIG. 4. The or each seal 5 may be a mat, for example a fibre mat such as an intumescent fibre mat.

The seal 5 may function to restrict bypass of exhaust gas around the monolith 3, therefore helping to ensure that the exhaust gas flow passes through the gas flow passages of the monolith 3. The seal 5 may also provide some additional damping against shock and vibrations in addition to the knit wire mesh bearing elements 4.

Figure 1:
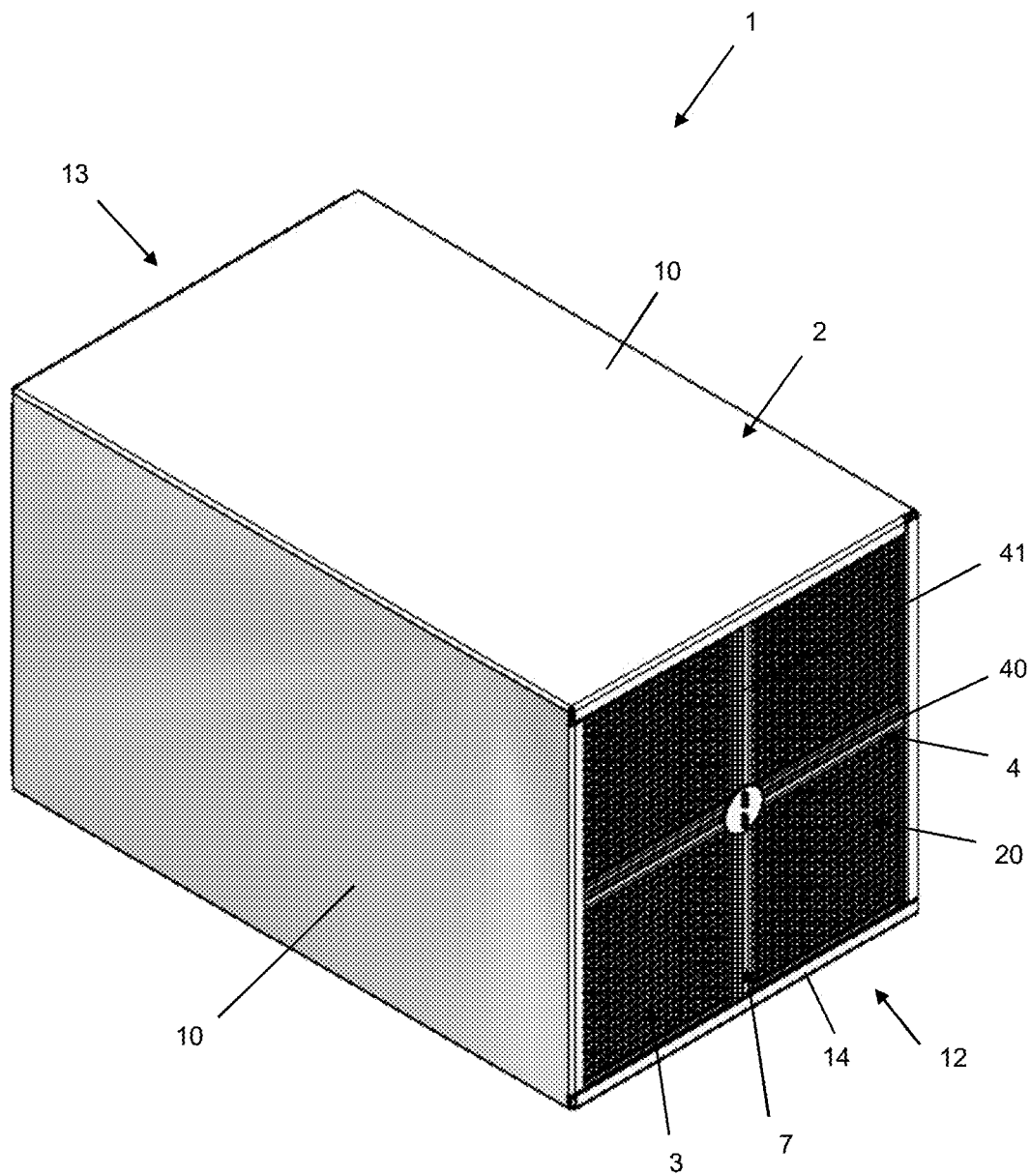
FIG. 1 is a perspective view of an element frame assembly according to the present disclosure.

As shown in FIG. 1, the element frame assembly 1 may further comprise at least one locking element 40, 41 with each locking element 40, 41 extending across the inlet end 12 or outlet end 13 of the element frame 2 and being connected to two opposite sides of the element frame 2. Each locking element 40, 41 can be connected to its respective walls 10 by welding. At least two locking elements 40, 41 may be located on the inlet end 12 of the element frame 2 and at least two locking elements 40, 41 may be located on the outlet end of the element frame 2. The at least two locking elements 40, 41 may be arranged as a cross and a locking plate 42 may be provided at a junction between the at least two locking elements 40, 41. The two locking elements 40, 41 and the locking plate 42 may together form a locking plate assembly 7 as shown in FIG. 15.

The locking elements 40, 41 are preferably orientated such that the planar bodies of the locking elements 40, 41 are parallel to the longitudinal axis of the monoliths 3. In other words, as shown in FIG. 1, it is preferred that the locking elements 40, 41 present an edge towards the respective inlet end 12 and outlet end 13. This has an advantage in preventing the locking elements 40, 41 obscuring any of the cells of the monoliths 3 which would inhibit gas flow into or out of the monoliths 3.

The locking elements 40, 41 and locking plate 42 may typically be made of the same material as the walls 10 of the element frame 2, i.e. steel of a suitable grade.

Figure 15:
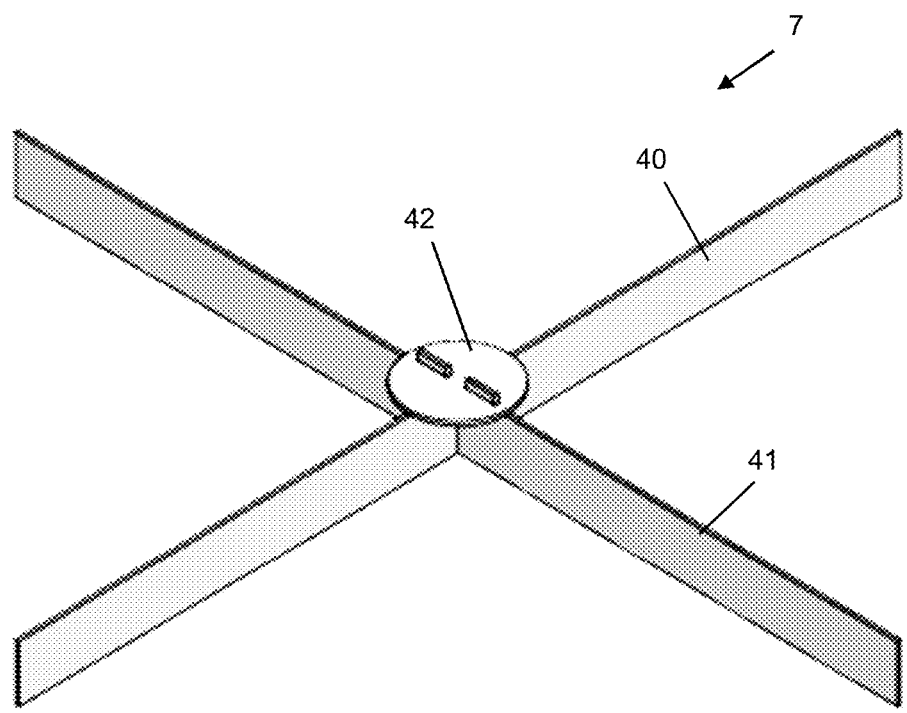
FIG. 15 is a perspective view of a locking element assembly of the element frame assembly of FIG. 1.
Figure 16:
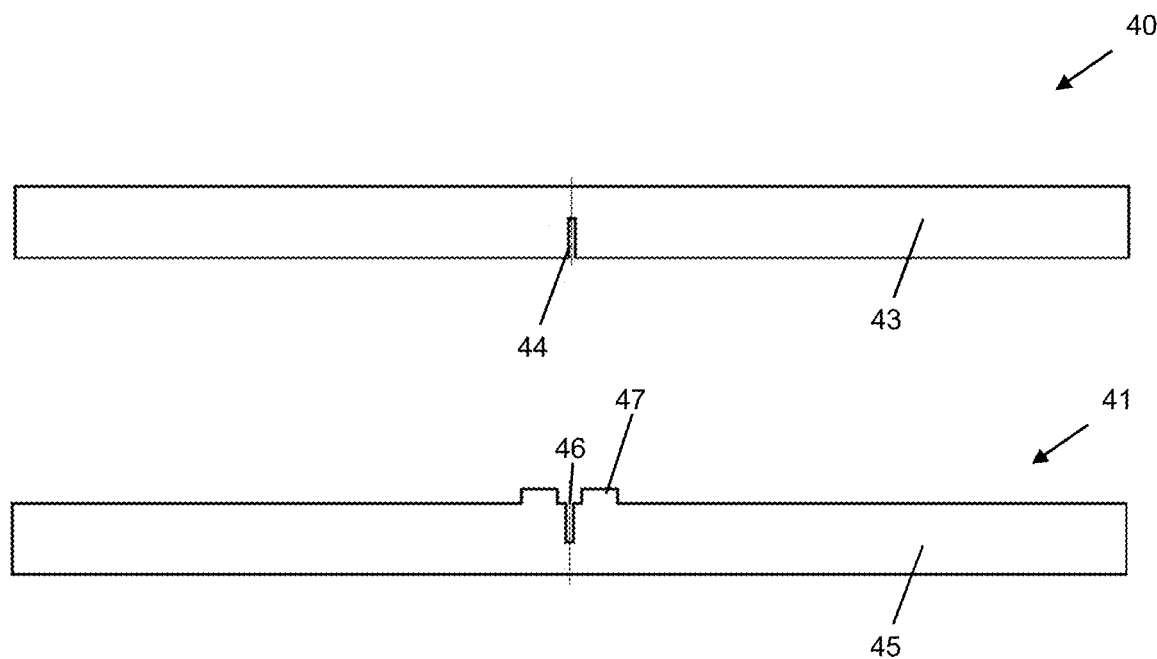
FIG. 16 is a side view of first and second locking elements of the locking element assembly of FIG. 15.
Figure 17:
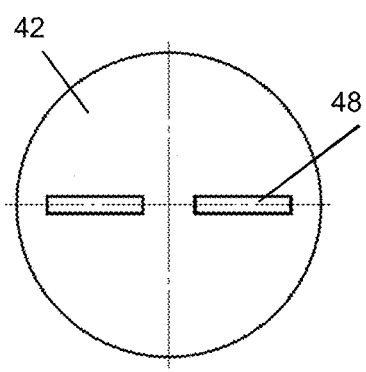
FIG. 17 is a plan view of a locking plate of the locking element assembly of FIG. 15.

As shown in FIGS. 15 to 17, the locking plate assembly 7 may be assembled by interconnecting a first locking element 40 and a second locking element 41 with the locking plate 42. The first locking element 40 may comprise a slot 44 at its mid-point that extends approximately half way through a body 43 of the first locking element 40. The second locking element 41 may similarly comprise a slot 46 at its mid-point that extends approximately half way through a body 45 of the second locking element 41. The first and second locking elements 40, 41 may thus be slotted together as shown in FIG. 15. The second locking element 41 may further be provided with two upstanding lugs 47. The locking plate 42 may be provided with two corresponding apertures 48 that are shaped and sized to receive the lugs 47 as shown in FIG. 15. Once assembled as shown in FIG. 15, the lugs 47 may be welded to the locking plate 42 to hold the locking plate assembly 7 together.

As shown in FIG. 2, when assembled to the element frame 2, the locking plate 42 of the locking plate assembly 7 engages the or each knit wire mesh bearing element 4 at that end of the element frame 2. In particular, a rear face of the locking plate 42 engages the first portion 32 of the or each knit wire mesh bearing element 4 that overlies the inlet face of the or each monolith 3.

When the element frame 2 comprises at least two monoliths 3, a space may be located between adjacent monoliths 3 and one or both locking elements 40, 41 of the locking plate assembly 7 may be centred on, and preferably located in, the space between the at least two monoliths 3. The or each locking element 40, 41 may be sandwiched between the second portions 33 of two adjacent knit wire mesh bearing elements 4.

The or each flange 14 that extends inwardly from the inlet end 12 and or the outlet end 13 perpendicular to the walls 10 may engage the or each knit wire mesh bearing element 4.

In another aspect of the present disclosure, a catalyst module can be provided which comprises grouping together a plurality of the element frame assemblies 1.

The catalyst modules may be formed with or without a peripheral frame.

A catalyst module without a peripheral frame can be formed by combining a plurality of element frame assemblies 1 to each other by placing element frame assemblies 1 adjacent to each other and on top of each other and connecting adjacent element frame assemblies together.

In another aspect of the present disclosure an exhaust system can be provided comprising one or more element frame assemblies 1 or a catalyst module as described above. The exhaust system may be an exhaust system of a stationary combustion system, for example a marine or naval stationary combustion system.

EXAMPLES

Figure 18:
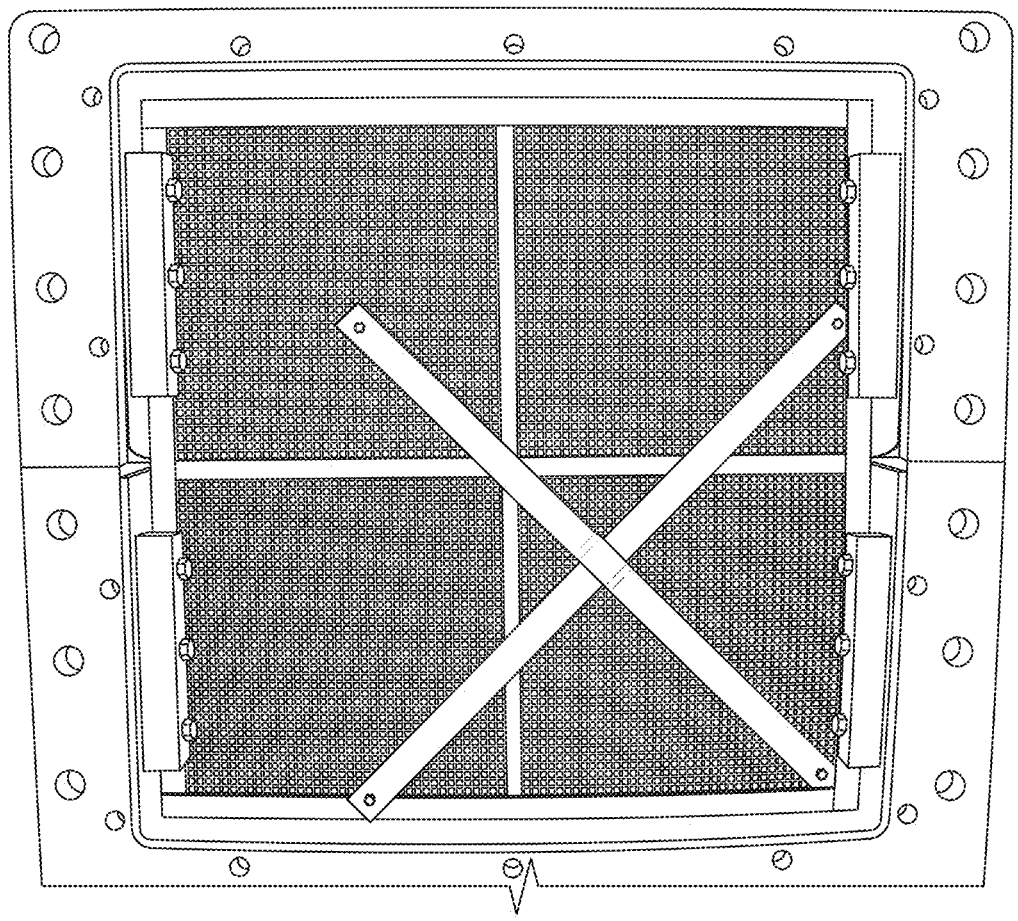
FIGS. 18 and 19 show results of a test of an element frame assembly not according to the present disclosure.
Figure 19:
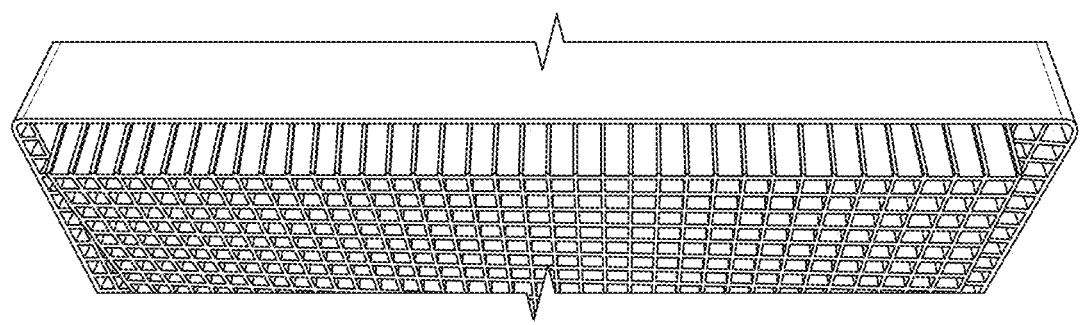

FIGS. 18 and 19 show results of a random vibration test on a hot shaker test bench on an element frame assembly not according to the present disclosure. This element frame assembly comprised four monoliths arranged in a 2 by 2 configuration. Intumescent mats were arranged between each monolith and each adjacent wall or monolith. In addition, two locking elements were provided at the inlet end and outlet end of the element frame. These locking elements formed a cross-shape and were orientated with their planar bodies perpendicular to the longitudinal axis of the element frame assembly such that the locking elements lay across the inlet face and outlet face of the monoliths.

As shown in FIGS. 18 and 19 the intumescent mats were unable to provide a high enough bearing and damping force to prevent failure of the element frame assembly. During the test it was observed that the monoliths underwent significant lateral movement and the mats quickly wore out. In addition, the locking elements deformed leading to fracture of their welding. As shown in FIG. 19, the monolith suffered significant damage especially along its inlet and outlet edges.

Figure 20:
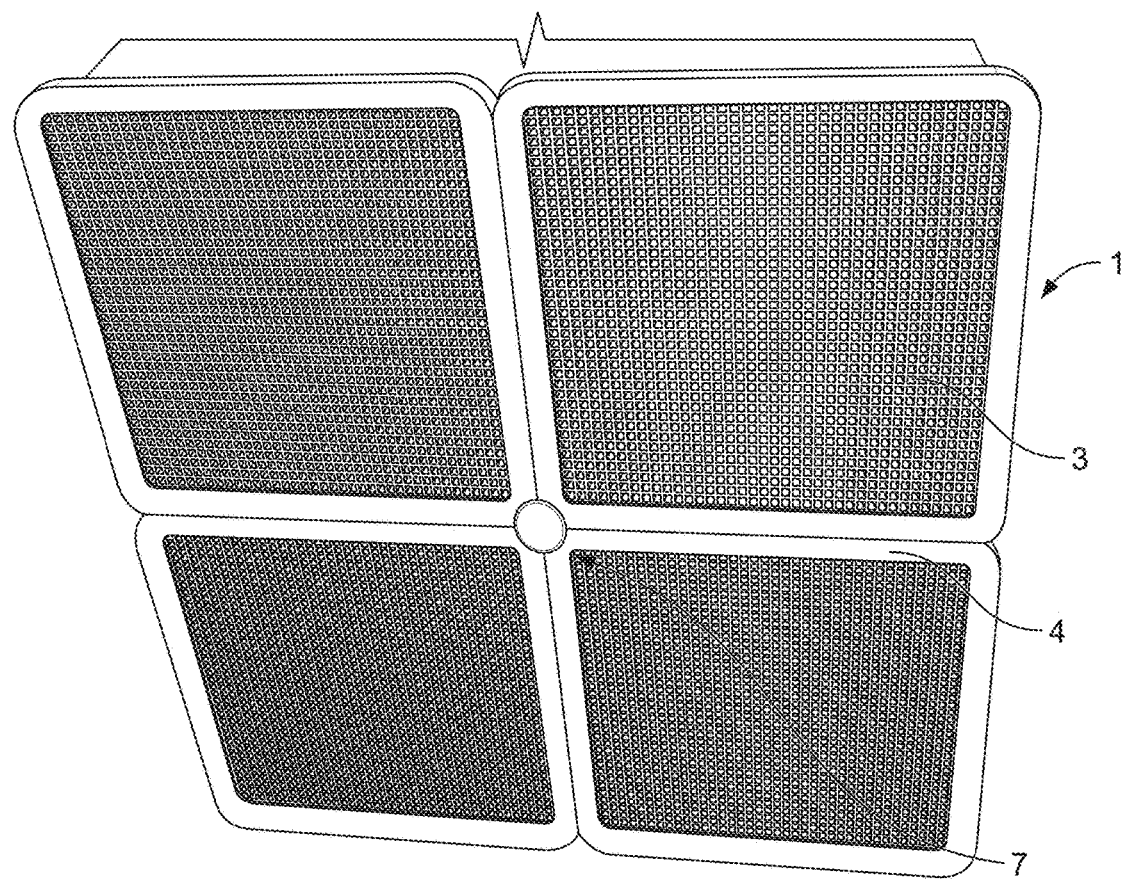
FIGS. 20 and 21 show results of a test of an element frame assembly according to the present disclosure.
Figure 21:
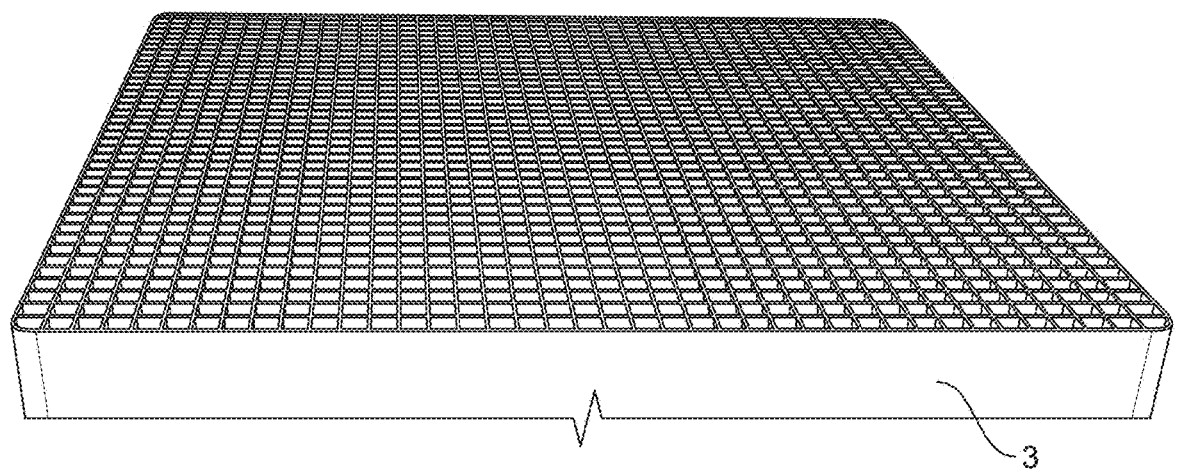

FIGS. 20 and 21 show results of the same random vibration test on a hot shaker test bench on an element frame assembly according to the present disclosure. This element frame assembly comprised four monoliths 3 arranged in a 2 by 2 configuration. Square-shaped, annular knit wire mesh bearing elements 4 were provided at the inlet and outlet of each monolith 3. In addition, two locking plate assemblies 7 of the type shown in FIG. 15 were provided at the inlet end and outlet end of the element frame 2.

During the test it was observed that the monoliths 3 underwent significantly less movement. In addition, the locking plate assemblies 7 were not deformed or fractured. As shown in FIG. 20, the element frame assembly 1 successfully passed the test and, as shown in FIG. 21 the monolith edges were substantially free of damage.

Further aspects and embodiments of the present disclosure are set out in the following clauses:

Clause 1. An element frame assembly for holding at least one monolith containing catalysts in the flow of exhaust gases from a combustion source, the element frame assembly comprising an element frame and at least one monolith;
  the element frame comprising:
    two pairs of opposing walls, wherein the walls form a rectangular or square shape;
    an interior formed by the walls;
    an inlet end; and
    an outlet end;
  the least one monolith comprising:
    an inlet;
    an outlet;
    four sides; and
    at least one catalyst effective in reducing the concentration of one or more gases in the exhaust gas;
  the element frame assembly further comprising at least one knit wire mesh bearing element;
  wherein the at least one monolith is positioned in the interior of the element frame so that there is at least a portion of the at least one knit wire mesh bearing element between the at least one monolith and each adjacent wall of the element frame.

Clause 2. The element frame assembly of clause 1, wherein the at least one knit wire mesh bearing element is located at the inlet end and or the outlet end of the element frame.

Clause 3. The element frame assembly of clause 1 or clause 2, wherein the at least one knit wire mesh bearing element extends over at least one edge of the at least one monolith at the inlet and or the outlet of the at least one monolith.

Clause 4. The element frame assembly of any preceding clause, wherein the inlet of the at least one monolith comprises two pairs of opposing inlet edges, wherein the inlet edges form a rectangular or square shape; and the at least one knit wire mesh bearing element extends over the two pairs of opposing inlet edges.

Clause 5. The element frame assembly of any preceding clause, wherein the outlet of the at least one monolith comprises two pairs of opposing outlet edges, wherein the outlet edges form a rectangular or square shape; and the at least one knit wire mesh bearing element extends over the two pairs of opposing outlet edges.

Clause 6. The element frame assembly of any preceding clause, wherein the at least one knit wire mesh bearing element has an annular shape.

Clause 7. The element frame assembly of any preceding clause, wherein the at least one knit wire mesh bearing element has a rectangular or square shape.

Clause 8. The element frame assembly of any preceding clause, wherein the at least one knit wire mesh bearing element has a rectangular ring shape or a square ring shape.

Clause 9. The element frame assembly of any preceding clause, wherein the at least one knit wire mesh bearing element comprises a first portion that extends over a part of the inlet or outlet of the at least one monolith and a second portion that extends along a part of the four sides of the at least one monolith.

Clause 10. The element frame assembly of clause 9, wherein the first portion and the second portion of the at least one knit wire mesh bearing element extend perpendicularly to each other, preferably forming an L-shape in cross-section.

Clause 11. The element frame assembly of clause 9 or clause 10, wherein the first portion extends 2 to 10 mm, optionally 3 to 8 mm, optionally 5 mm over an inlet face of the inlet or the outlet face of the outlet of the at least one monolith.

Clause 12. The element frame assembly of any one or clauses 9 to 11, wherein the second portion extends 5 to 25 mm, optionally 8 to 15 mm, optionally 12 mm along the four sides of the at least one monolith.

Clause 13. The element frame assembly of any preceding clause, wherein the at least one knit wire mesh bearing element comprises a first knit wire mesh bearing element located at the inlet end of the element frame and a second knit wire mesh bearing element located at the outlet end of the element frame.

Clause 14. The element frame assembly of clause 13, further comprising at least one seal located between the at least one monolith and each adjacent wall of the element frame, the at least one seal being located longitudinally between the first knit wire mesh bearing element and the second knit wire mesh bearing element.

Clause 15. The element frame assembly of clause 14, wherein the seal is a mat, optionally a fibre mat, optionally an intumescent fibre mat.

Clause 16. The element frame assembly of any preceding clause, wherein two or more monoliths are present in the interior of the element frame, the at least two monoliths are located adjacent to each other, and the at least one knit wire bearing element is located between monoliths that are adjacent to each other.

Clause 17. The element frame assembly of clause 16, wherein the at least one knit wire mesh bearing element comprises a first knit wire mesh bearing element located at the inlet end of the element frame and a second knit wire mesh bearing element located at the outlet end of the element frame.

Clause 18. The element frame assembly of any one of clauses 16 to 17, further comprising at least one mat located between adjacent monoliths, the at least one mat being located longitudinally between the first knit wire mesh bearing element and the second knit wire mesh bearing element.

Clause 19. The element frame assembly of clause 18, wherein the mat is a fibre mat, preferably an intumescent fibre mat.

Clause 20. The element frame assembly of any preceding clause, wherein four or more monoliths are present in the interior of the element frame, the at least four monoliths are located in a two-by-two matrix arrangement with each monolith being adjacent to two others, and the at least one knit wire bearing element is located between monoliths that are adjacent to each other.

Clause 21. The element frame assembly of any preceding clause, wherein a separate knit wire mesh bearing element is located at each of the inlet and the outlet of each of the at least one monoliths.

Clause 22. The element frame assembly of any preceding clause, wherein the at least one knit wire mesh bearing element comprises knit wire mesh.

Clause 23. The element frame assembly of clause 22, wherein the knit wire mesh is formed from any suitable steel, for example a carbon steel, a stainless steel, for example type 1.4301 or type 1.4307 stainless steel.

Clause 24. The element frame assembly of any preceding clause, wherein the at least one knit wire mesh bearing element has a density of 0.8 to 1.5 g/cm$^3$, optionally 1.1 to 1.3 g/cm$^3$, optionally 1.2 g/cm$^3$.

Clause 25. The element frame assembly of any preceding clause, wherein the at least one knit wire mesh bearing element has a spring deflection of 0.9 to 1.5 mm.

Clause 26. The element frame assembly of any preceding clause, wherein the element frame assembly further comprises at least one locking element; each locking element extending across the inlet end or outlet end of the element frame and being connected to two opposite sides of the element frame.

Clause 27. The element frame assembly of clause 26, wherein at least two locking elements are located on the inlet end of the element frame and at least two locking elements are located on the outlet end of the element frame.

Clause 28. The element frame assembly of clause 27, wherein the at least two locking elements are arranged as a cross and a locking plate is provided at a junction between the at least two locking elements, wherein the locking plate engages the at least one knit wire mesh bearing element.

Clause 29. The element frame assembly of any one of clauses 26 to 28, wherein, when the element frame comprises at least two monoliths, a space is located between adjacent monoliths and at least one of the locking elements is centred on, and optionally located in, the space between the at least two monoliths.

Clause 30. The element frame assembly of any one of clauses 26 to 29, wherein the at least one knit wire mesh bearing element comprises a first portion that extends over a part of the inlet or outlet of the at least one monolith and a second portion that extends along a part of the four sides of the at least one monolith, and the locking plate engages the first portion of the at least one knit wire mesh bearing element.

Clause 31. The element frame assembly of clause 30, wherein each locking element is located in a space between two monoliths with the locking element sandwiched between the second portions of two adjacent knit wire mesh bearing elements.

Clause 32. The element frame assembly of any preceding clause, wherein the element frame further comprises one or more flanges that extend inwardly from the inlet end and or the outlet end perpendicular to the walls; wherein the one or more flanges engage the at least one knit wire mesh bearing element.

Clause 33. The element frame assembly of any preceding clause, wherein the element frame comprise two L-shaped assemblies, each L-shaped assembly comprising one wall of each of the two pairs of opposing walls.

Clause 34. The element frame assembly of clause 33, wherein the two L-shaped assemblies are connectable together, optionally by welding, to form the element frame.

Clause 35. The element frame assembly of any preceding clause, wherein the at least one monolith each have a rectangular or square shape.

Clause 36. The element frame assembly of any preceding clause, wherein the monolith comprises an SCR catalyst; an oxidation catalyst; or a filter.

Clause 37. An element frame assembly for holding at least one monolith containing catalysts in the flow of exhaust gases from a combustion source, the element frame assembly comprising an element frame and four or more monoliths;
  the element frame comprising:
    two pairs of opposing walls, wherein the walls form a rectangular or square shape;
    an interior formed by the walls;
    an inlet end;
    an outlet end; and
    one or more flanges that extend inwardly from the inlet end and or the outlet end perpendicular to the walls;
  the four or more monoliths each having a rectangular or square shape and comprising:
    an inlet;
    an outlet;
    four sides; and
    at least one catalyst effective in reducing the concentration of one or more gases in the exhaust gas;
  wherein the four or more monoliths are positioned in the interior of the element frame, at least four of the monoliths being located in a two-by-two matrix arrangement with each monolith being adjacent to two others;
  there being positioned on each of the at least four monoliths a first knit wire mesh bearing element that extends over edges of the monolith at its inlet and a second knit wire mesh bearing element that extends over edges of the monolith at its outlet;
  the first knit wire mesh bearing elements and the second knit wire mesh bearing elements being positioned between adjacent pairs of the at least four monoliths and between the at least four monoliths and adjacent walls of the element frame.

Clause 38. A catalyst module comprising a plurality of element frame assemblies according to any preceding clause.

Clause 39. An exhaust system comprising an element frame assembly according to any of clauses 1 to 37 or a catalyst module according to clause 38.

Clause 40. The exhaust system of clause 39, which is an exhaust system of a stationary combustion system, optionally a naval stationary combustion system.

The invention claimed is:

1. An element frame assembly for holding at least one monolith containing catalysts in the flow of exhaust gases from a combustion source, the element frame assembly comprising an element frame and four or more monoliths;
  the element frame comprising:
    two pairs of opposing walls, wherein the walls form a rectangular or square shape;
    an interior formed by the walls;
    an inlet end; and
    an outlet end; and
    one or more flanges that extend inwardly from the inlet end and or the outlet end perpendicular to the walls;
  the four or more monoliths each having a rectangular or square shape and comprising:
    an inlet;
    an outlet;
    four sides; and
    at least one catalyst effective in reducing the concentration of one or more gases in the exhaust gas;
  wherein the four or more monoliths are positioned in the interior of the element frame, at least four of the monoliths being located in a two-by-two matrix arrangement with each monolith being adjacent to two others; there being positioned on each of the at least four monoliths a first knit wire mesh bearing element that extends over edges of the monolith at its inlet and a second knit wire mesh bearing element that extends over edges of the monolith at its outlet; the first knit wire mesh bearing elements and the second knit wire mesh bearing elements being positioned between adjacent pairs of the at least four monoliths and between the at least four monoliths and adjacent walls of the element frame.

2. The element frame assembly of claim 1, wherein the inlet of each monolith comprises two pairs of opposing inlet edges, wherein the inlet edges form a rectangular or square shape; and each first knit wire mesh bearing element extends over the two pairs of opposing inlet edges.

3. The element frame assembly of claim 1, wherein the outlet of each monolith comprises two pairs of opposing outlet edges, wherein the outlet edges form a rectangular or square shape; and each second knit wire mesh bearing element extends over the two pairs of opposing outlet edges.

4. The element frame assembly of claim 1, wherein each first and second knit wire mesh bearing element comprises a first portion that extends over a part of the inlet or outlet of the at least one monolith and a second portion that extends along a part of the four sides of the monolith.

5. The element frame assembly of claim 1, further comprising at least one seal located between each monolith and each adjacent wall of the element frame, the at least one seal being located longitudinally between the first knit wire mesh bearing element and the second knit wire mesh bearing element.

6. The element frame assembly of claim 5 wherein the seal is a mat.

7. The element frame assembly of claim 5 wherein the at least one seal has a longitudinal length that is from 20% to 40% of the longitudinal length of the at least one monolith.

8. The element frame assembly of claim 5 wherein the at least one seal is located at a mid-point of the length of the element frame assembly.

9. The element frame assembly of claim 8, wherein at least two locking elements are located on the inlet end of the element frame and at least two locking elements are located on the outlet end of the element frame; wherein the at least two locking elements are arranged as a cross and a locking plate is provided at a junction between the at least two locking elements, wherein the locking plate engages the at least one knit wire mesh bearing element.

10. The element frame assembly of claim 9, wherein the each first and second knit wire mesh bearing element comprises a first portion that extends over a part of the inlet or outlet of the monolith and a second portion that extends along a part of the four sides of the at least one monolith, and the locking plate engages the first portion of the knit wire mesh bearing element.

11. The element frame assembly of claim 9, wherein a space is located between adjacent monoliths and at least one of the locking elements is centred on, and located in the space between the four or more monoliths.

12. The element frame assembly of claim 1, wherein the element frame assembly further comprises at least one locking element;
   each locking element extending across the inlet end or outlet end of the element frame and being connected to two opposite sides of the element frame.

13. The element frame assembly of claim 1, wherein the element frame further comprises one or more flanges that extend inwardly from the inlet end and or the outlet end perpendicular to the walls; wherein the one or more flanges involve the first and/or second knit wire mesh bearing element.

14. A catalyst module comprising a plurality of element frame assemblies according to claim 1.

15. An exhaust system comprising an element frame assembly according to claim 1.

* * * * *